INVENTORS
WERNER GOLOMBEK
FRANCISCUS TIMMERMANS
BY
Frank R. Trifari
AGENT

INVENTORS
WERNER GOLOMBEK
FRANCISCUS TIMMERMANS
BY
Frank R. Trifari
AGENT

INVENTORS
WERNER GOLOMBEK
FRANCISCUS TIMMERMANS
BY
Frank R. Trifari
AGENT

United States Patent Office 3,522,550

Patented Aug. 4, 1970

3,522,550

HIGH FREQUENCY HEATING DEVICE INCLUDING A SELF-EXCITED VELOCITY MODULATION TUBE GENERATOR FOR CONTINUOUS OPERATION

Werner Golombek, Quickborn, and Franciscus Timmermans, Harksheide, Germany, assignors, by mesne assignments, to U.S. Philips Corporation, New York, N.Y., a corporation of Delaware Filed Sept. 28, 1967, Ser. No. 671,448
Claims priority, application Germany, Sept. 29, 1966, P 40,464
Int. Cl. H05b 9/06
U.S. Cl. 331—88 6 Claims

ABSTRACT OF THE DISCLOSURE

A microwave oven for lossy materials in which the system efficiency is increased by coupling the magnetron generator to the load by means of a waveguide of length:

$$L_w \geq \frac{Q_{E\ Gen} \frac{\lambda_0^2}{\lambda_w}}{\pi(S^2_{max}-1)}$$

Figure 1:
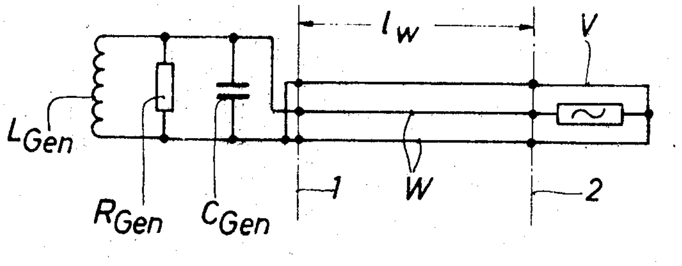

The present invention relates to a device for producing high frequency oscillations and more particularly to a high frequency device which is provided with a self-excited velocity modulation tube generator in continuous operation, preferably a continuous-wave magnetron, which is coupled through a coupling member to a variable load.

In the present application, the term "continuous operation" is to be understood to mean operation in which, in contrast with periodic pulse operation, mainly gives a continuous-wave output, that is to say "continuous operation" as defined herein includes intermittent continuous-wave operation and operation with an unsmoothed operating voltage or an A.C. operating voltage.

High-frequency generators in continuous operation are used in telecommunication systems, for example, as transmitters or super-heterodyne oscillators, and are generally required to have given properties, such as constant frequency and amplitude, a linear modulation characteristic and low intrinsic noise. In order to avoid external reactions, the generator is designed for optimum load matching or, if this is not simply possible, an artificial load is provided in which a comparatively large part, or even the larger part, of the generator output power is dissipated. This prevents changes in the operating values of the generator, for example, its frequency and output power, caused by fluctuations or variations of the load which may occur during operation.

Such conditions for satisfactory matching, however, are not available in generators in continuous operation which, usually at comparatively large power levels, are used for high-frequency heating of high-loss materials or for other purposes, for example, for exciting plasmas. In such uses the generator loading may vary over a wide range depending upon the kind, the physical properties, the mass, the dimensions and the coupling of the load to the generator. Also, those properties of the material to be heated (its loss angle $\delta$ and dielectric constant $\epsilon_{rel}$). The foregoing are some of the factors that cause the load to vary during heating to a greater or lesser extent. This is the case, for example, in thawing frozen food at the transition point of the liquid part thereof from the solid to the liquid state or, in the excitation of plasmas upon the ignition of the plasma or upon variations of the gas pressure, and the like.

In addition, in high frequency heating devices, to ensure a uniform field distribution in the material to be heated, there is frequently provided a field stirrer, a swash disc or the like. For maximum efficiency, this element must be arranged near the point of energy supply and greatly varies the load imposed on the generator.

The fact that the load varies over a wide range and may even vary during operation affects the operating values of the generator. This influence of the load on the generator may be read from the generator diagram in which, with respect to a defined generator admittance in families of curves, the relationship between the output power, the frequency and the complex reflection factor of the load coupled to the generator are recorded. The complex reflection factor in turn is a function of the complex load admittance. The generator diagram of self-excited velocity modulation tube generators include regions in which the generator must not be allowed to operate. These regions are the region of electronic instability (the sink region) and the thermal border region. In the region of electronic instability, the normal oscillation mode of the generator abruptly changes to another oscillation mode in which the efficiency of the generator is so low that it will rapidly break down, or there is a sudden cessation of the desired oscillation mode without another mode being excited so that, although the generator is not damaged, it does not supply power to the load.

On the other hand, prolonged operation in the thermal border region may reduce the life of the generator or, owing to the increase in temperature with the accompanying poor efficiency, may load to a gas eruption or other thermal disturbances.

All the possible reflection factors of the load must lie in the region between the two above-mentioned regions to ensure stable operation of the generator and to avoid damage. It is true there are possible uses, for example, heating homogeneous uniform articles by the continuous-furnaced method, in which the load can be satisfactorily matched to the generator. In most cases, however, the heating device must be designed so that without modifying the device, articles of widely different shape and consistency can be heated with the absorption of a maximum part of the power delivered by the generator.

Many steps are known which have been used in endeavours to keep the operating point within the permissible limits in the generator diagram despite such divergent conditions. In the case of a magnetron as the generator, for example, it is known from "Valvo-Berichte," vol. VII, No. 1, pages 16 and 17, to design the heating space which accommodates the load and which generally is a space which is enclosed by metal walls and the dimensions of which considerably exceed those of the load, and the transforming coupling and tuning members between the generator and the heating space, so that in the case of an "average" heating system (a heating system having average values) the complex load admittance which appears at the generator output corresponds to an operating point which lies in the central part of the generator diagram and hence is spaced from the two forbidden regions by approximately equal distances. For this purpose, however, there are no general dimensioning rules so that the optimum arrangement must be found by laborious experiments and measurements and at best by trial and error. Care must be taken to be sure that the operating point does not leave the permitted region in any of the extreme loading cases and especially that it does not enter the region of electronic instability.

In this manner, however, it is impossible to allow for all loading cases, including unloaded operation with no other load than the natural damping of the heating space. To protect the generator in any case, it is therefore usual either to make the intrinsic losses of the heating space large enough or to provide an additional load in the heating space which dissipates a certain part of the energy supplied, or to connect the heating space and the generator by a unidirectional link which absorbs at least part of the energy reflected back to the generator because of mismatching (cf. the above-mentioned "Valvo-Berichte" page 30).

Further measures for protecting the generator include a temperature-sensitive switch in the thermal border region and a circuit arrangement responsive to the complex reflection factor or to the oscillation mode in the electronic border region.

Instead of the reflection factor, usually the maximum permissible voltage standing wave ratio (V.S.W.R.) $s$ at the generator connection is used as a measure of the highest deviation from ideal matching. The V.S.W.R. is a property of the type of generator employed and depends upon its construction and the manner of operation. Increasing values of the V.S.W.R. are shown in the generator diagram by circles of increasing radius about the centre of the diagram.

Although the steps described prevent, with some certainty, the occurrence of an impermissible operating point, they have a limitation in that, for example, in the case of the additional load method, an unduly large part of the generator output power is dissipated, whereas with the use of a protective circuit operation is interrupted. Also the maximum possible output power cannot be fully utilized. This is due to the fact that, as the generator diagram shows, the output power increases in a direction towards the region of electronic instability as a result of the increase in efficiency, and decreases in a direction towards the thermal border region as a result of the decrease in efficiency. Therefore with an average load the operating point is required to be situated midway between these two regions and in particular must not be allowed to approach too closely the region of electronic instability which forms a narrow more or less sector-shaped portion of the generator diagram outside the circle determined by the maximum permissible V.S.W.R., $s_{max}$. Thus, exactly the regions of high efficiency and hence of high power and of stable operating conditions outside the region of electronic instability cannot be utilized as operating regions owing to the requirement that all possible operating conditions must lie within the circle of the maximum permissible V.S.W.R., $s_{max}$.

It is an object of the invention to obviate these disadvantages and to provide, in a device for producing high frequency oscillations of the kind described in the preamble, a method of loading the generator in which, with an average load, the operating point may be situated considerably farther into the region of comparatively high generator power without the risk of the operating point entering the region of electronic instability under any load conditions.

According to the invention, this is achieved by using a coupling member comprising a substantially loss-free wave-guide W of length $$l_W \geq \frac{Q_{E\ Gen.} \cdot \frac{\lambda_0^2}{\lambda_W}}{\pi(s^2_{max.}-1)}$$

where:

$Q_{E\ Gen}$ is the external Q factor of the generator, $\lambda_0$ is the wavelength in free space at the mean generator frequency $\omega_{0\ Gen}$, $\lambda_W$ is the wavelength in the wave guide at the mean generator frequency $\omega_{0\ Gen}$, and $s_{max}$ is the maximum permissible V.S.W.R. of the generator viewed in a direction towards the region of electronic instability.

$\omega_{0\ Gen}$ is defined as the mean generator oscillation frequency which is produced when the generator *Gen* is loaded by a purely ohmic load. The invention is based on a certain insight which is contrary to the above mentioned tendency to avoid the region of electronic instability by optimum load matching. In proportioning the wave-guide in accordance with the invention, use is made of a phenomenon which in transmitter technology is known as cable reaction ("long line effect"). This long-line effect is an undesirable phenomenon which occurs in tuning self-excited transmitters when the antenna feeder is long and the antenna is not reflection-free. It manifests itself by an abrupt change in the transmitter frequency when the transmitter is tuned or its frequency is changed in any other manner, as is the case, for example, in frequency-modulation transmitters or during the pulse in pulse-modulation transmitters (cf. inter alia Meinke-Gundlach "Handbuch der Hochfrequenztechnik," 2nd edition, pages 1157–1159, and "Electronics," Feb. 27, 1954, page 168).

In the device in accordance with the invention, which utilizes a wave-guide proportioned according to the above formula, the operating point skips the region of electronic instability with sufficient certainty when the value of the load resistance is such that the operating point of the generator would otherwise be located in the region of electronic instability. As a result, stable operating points are possible only outside the region of electronic instability, as will be described more fully hereinafter with reference to an embodiment given by way of example.

This advantageously permits a choice of the load or of the coupling of the load to the wave-guide such that the generator operates substantially in the high-efficiency region without the risk of the operating point being located in the region of electronic instability. In a preferred embodiment the wave-guide and the generator constitute a system which is well matched in itself and the load with average values is in itself well-matched to this system. Furthermore, by means of a variable transformation member disposed near the coupling-out plane of the generator, the load is coupled to the wave-guide in a manner such that the generator operates substantially in the high-efficiency region.

Lest the wave guide become excessively long, it may be chosen so that the wavelength in it is large compared with the wavelength in free space.

For the sake of completeness it should be mentioned that it is known from the U.S. Pat. 2,716,694 to use transmission lines of considerable length for connecting the generator to the heating space. However, as is described in this patent, the line is designed so as to permit satisfactory air cooling of the high-frequency connections of the generator. The object of the invention described in said patent is to achieve satisfactory distribution of the energy coupled into the heating space by bifurcation of the line and plural coupling-in. The line includes matching members required to provide optimum matching in the known manner described in the preamble.

Figure 4:
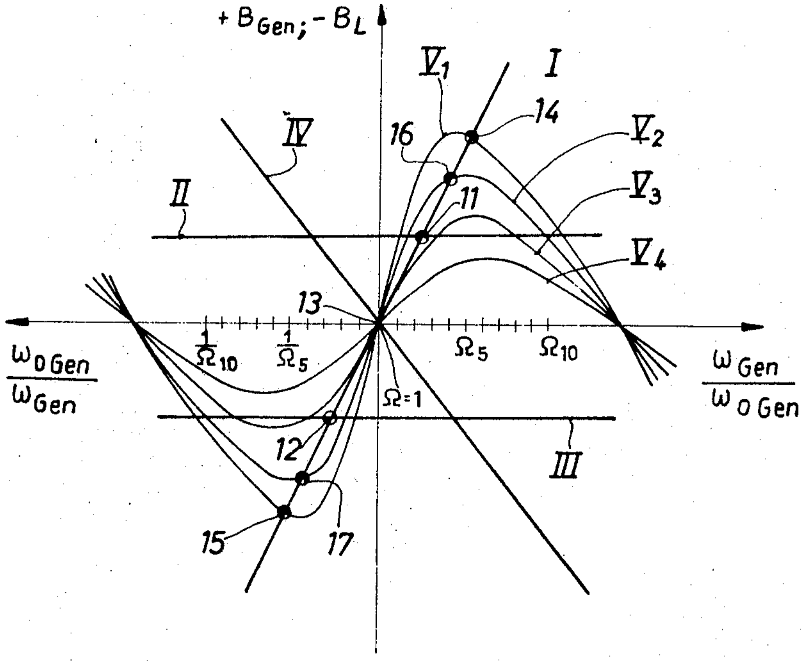
Figure 2:
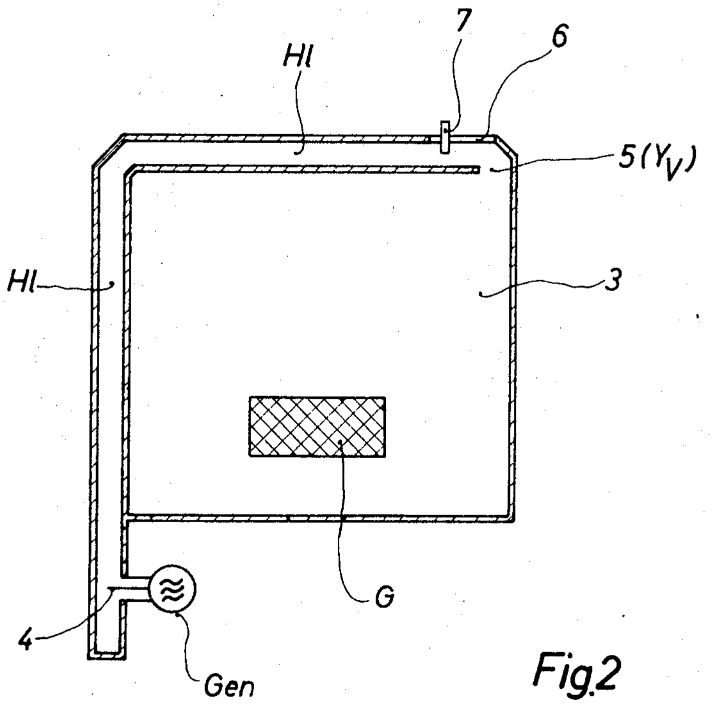
Figure 3:
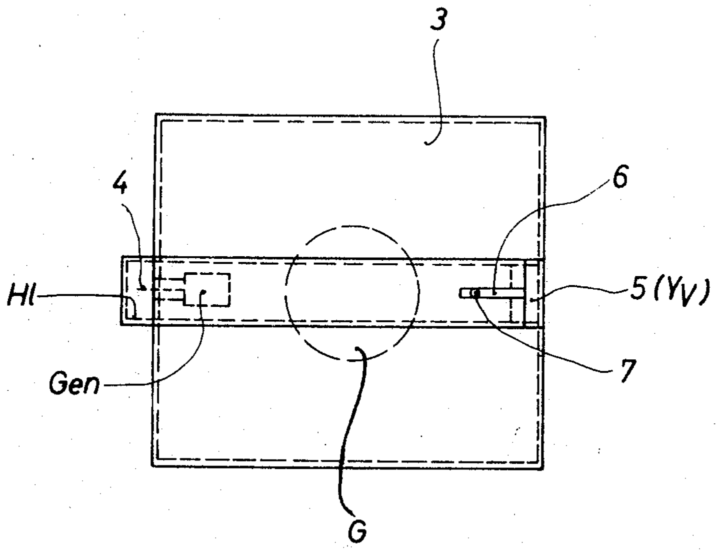
Figure 5:
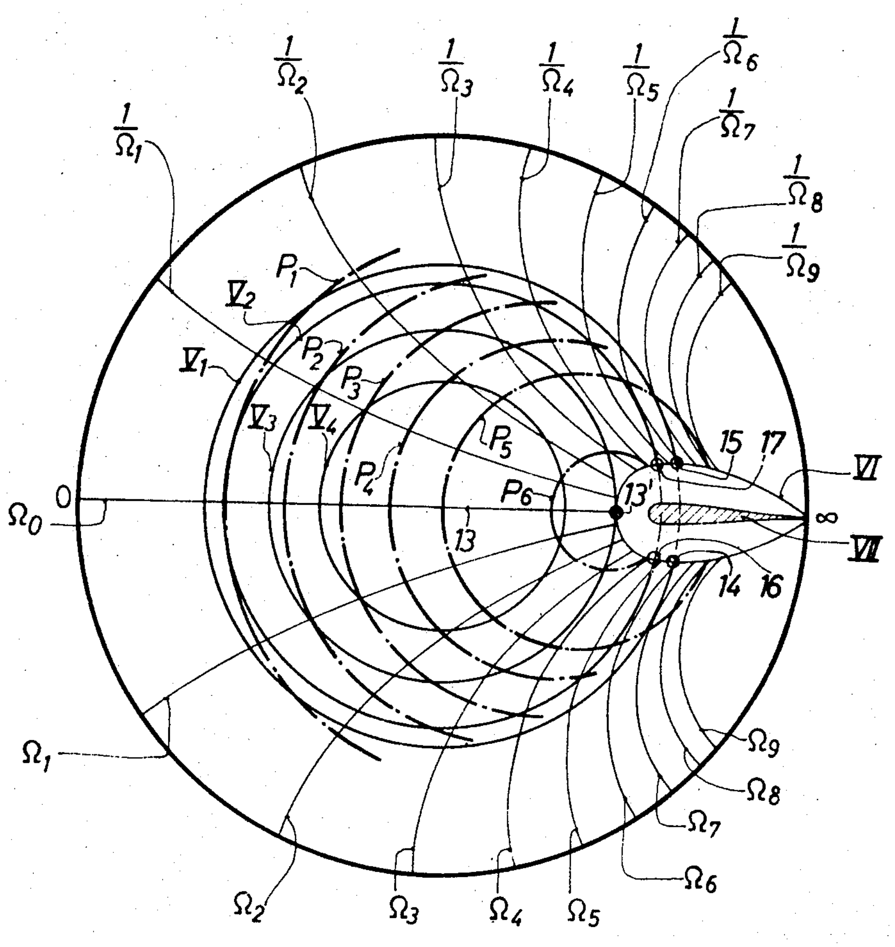

In order that the invention may readily be carried into effect, an embodiment thereof will now be described by way of example, with reference to the accompanying diagrammatic drawings, in which:

FIG. 1 is an equivalent circuit diagram of a device for generating high frequencies in which the member coupling the generator and the load is a concentric line, FIG. 2 is a diagrammatic cross-sectional view of a high-frequency heating device loaded by a cuboid-shaped heating space, FIG. 3 is a top plan view of the device shown in FIG. 2, FIG. 4 is a diagram which shows the relationship between the susceptances of the load appearing at the generator output and of the generator slotted against the generator frequency as scalar quantities, and FIG. 5 is a transformation of the diagram of FIG. 4 into the known representation of the generator diagram.

In the equivalent circuit shown in FIG. 1, there is connected to a coupling-out plane (load plane) 1 of a generator *Gen* a waveguide W in the form of a concentric line of length $l_W$. The other end of the line, in a load plane 2, is loaded by a load V of variable complex admittance. In the equivalent diagram the generator is shown as a LCR parallel circuit.

In the high-frequency heating device shown in FIGS. 2 and 3, the waveguide W is a section H*l* of a rectangular waveguide having one larger surface which also acts as a wall of a cuboid-shaped heating space 3 containing a material G to be heated. At one end the waveguide H*l* is conductively terminated. A high-frequency generator G*en* is coupled to the waveguide H*l* through a probe 4 at a distance of about $\lambda_w/4$ from the termination. The waveguide H*l* is so designed and the coupling between the generator and the waveguide H*l* is so chosen that the generator G*en* and the waveguide H*l* form a system which, in the frequency range of the generator, is well-matched in itself. For this purpose, inter alia the 90° corner joint of the waveguide is well-matched in known manner.

The waveguide H*l* also is conductively terminated at the end remote from the genertor G*en*. A slot 5 is provided in the sidewall facing the heating space 3 through which the energy is supplied to the heating space containing the lossy of material G which is to be heated.

The dimensions and the physical properties of the material G, the dimensions and shape of the space 3 and the dimensions and shape of the slot 5 and of any further matching and tuning members disposed in the space 3 influence the load admittance $Y_v=G_v+jB_v$ which occurs at the slot 5. Thus, in the load plane, which coincides with the slot 5, the waveguide H*l* is loaded by the load admittance $Y_V$. By a suitable choice of the tuning parameters, for example, the dimensions and shape of the slot 5, the load admittance $Y_V$ is adjusted so as to be well matched to the system comprising the generator and the waveguide in the absence of further tuning means at this point.

However, at the same end of the waveguide H*l*, there is provided in the sidewall of the waveguide H*l* facing the slot a longitudinal slot in which a tuning stud is mounted which is in good electric contact with the waveguide. The tuning stud is displaceable so that the distance through which it extends into the waveguide (hereinafter referred to as the penetration depth) is adjustable. This tuning stud enables a susceptance value to be set which depends upon the diameter and the penetration depth of the stud and the phase of which depends upon the location of the stud in the slot. The stud is adjusted so that in the generator diagram, with a load of average values, the operating point is predominantly located in the high-efficiency region.

The function of the device shown in FIGS. 2 and 3 will now be described more fully with reference to the equivalent circuit of FIG. 1 and the diagrams of FIGS. 4 and 5. A velocity modulation tube generator is an oscillator which, in the proximity of its resonance frequency, may be considered as a LCR parallel circuit (FIG. 1). When the generator acts on a complex load having an admittance $Y_L=G_L+jB_L$, the resulting generator frequency $\omega_{Gen}$ will attain a value such that the sum of the imaginary parts of the generator admittance and of the admittance of the load L appearing in the load plane 1 at the output of the generator is equal to zero:

$$B_{Gen}+B_L=0 \quad (1.1)$$

$$B_{Gen}=-B_L \quad (1.2)$$

In FIG. 4 the imaginary part $B_{Gen}$ is plotted against the standardized frequency $\omega_{Gen}/\omega_{0\,Gen}$ and $\omega_{0\,Gen}/\omega_{Gen}$, respectively, giving the curve I. It is assumed that the load V is directly connected to the generator G*en* in the load plane 1 without the interposition of the waveguide W. Thus, the load V corresponds to the load L and the complex admittance $Y_L$ of the load may be substituted for the complex admittance $Y_V$. If the load has an admittance including an inductive imaginary part, the susceptance $B_L$ may be represented by a curve II. Allowance is made for the fact that $-B_L$ is to be plotted, since according to Equation 1.2 for the oscillation $\omega_{Gen}$ produced the susceptance $B_{Gen}$ must be equal to $-1$ times the susceptance $B_L$, i.e. equal to $-B_L$.

The curves I and II have only a single point of intersection 11, which according to Equation 1.2 represents the frequency to which the generator adjusts itself.

The curve III represents the susceptance in this circuit arrangement (not including the waveguide W) when the load has an admittance comprising a capacitive imaginary part. This results in the frequency represented by the point of intersection 12 of the curves I nd III.

The curve IV shows the variation of the susceptance for a load having an admittance comprising both a capacitive and an inductive imaginary part which together form a parallel resonant circuit, the resonance frequency of which is equal to the mean frequency $\omega_{0\,Gen}$ of the generator. When the resonance frequency of this parallel resonant circuit differs from the mean frequency $\omega_{0\,Gen}$ of the generator G*en*, the curves I and IV are relatively shifted along the abscissa. In any case there will be only one point of intersection of the two curves I and IV and hence only one possible operating point of the generator.

Depending upon the real and imaginary parts of the admittance of the load, in the circuit arrangement not including a waveguide, in all three cases (capacitive, inductive or capacitive and inductive imaginary parts) the operating point may be located in the region of electronic instability so that the generator G*en* is liable to be damaged.

If now the load V and the generator G*en* are coupled together by the interposition of a waveguide W having a length in accordance with the above formula, the situation will be completely changed. Such a waveguide section W behaves as a high-Q resonance circuit and in accordance with the known line equations transforms the complex load admittance $Y_V$ from the load plane 2 to the load plane 1 so that in the load plane the susceptance $B_L$ in principle varies with respect to the standardized frequency in the manner shown by curves $V_1$ to $V_4$. The parameter of the family of curves is the standing-wave ratio *s*. Both the maximum value of the susceptance $-B_L$ and the slope of the curves V at the point of inflection increases with an increase in *s*.

The condition for stable adjustment of an operating point of the generator is that the differential quotient of the curves II to V of the susceptance of the load L at a point of intersection with the susceptance curve I of the generator is at most equal to, or smaller than, the differential quotient of the susceptance curve I of the generator (as has been set forth hereinbefore, this does not provide information whether the "stable" operating point is located inside or outside the region of electronic instability).

For the curves $V_1$ and $V_2$ the condition for a stable operating point is satisfied at the points of intersection 14, 15 and 16, 17, but is not satisfied at the points of intersection 13 of these curves and the curve I which pass through the origin of the coordinate axes. Should the load V have values such that the generator will adjust itself to an operating point on the steep parts of the susceptance curves $V_1$ and $V_2$ of the load L which pass through the origin, the operating point will skip the point of intersection at the origin and will be located in the first or third quadrant, depending upon the direction of skipping, so that a stable operating point in the intermediate region is impossible. This intermediate region, however, includes the region of electronic instability, as will be described hereinafter with reference to the generator diagram of FIG. 5 (in the diagram of FIG. 4 the region of electronic instability cannot be shown).

The boundary at which the operating point will not yet skip is shown by a curve $V_3$, the slope of which at the point of inflexion is equal to the slope of the curve I; the tangents to these two curves coincide in this area.

In this case the point 13 is the only possible and at the same time stable point of intersection of the curves I and $V_3$. The boundary curve $V_3$ applies to the maximum permissible standing-wave ratio $s_{max}$ of the generator when the length $l_W$ of the waveguide W is chosen in accordance with the above formula.

Like the curves II, III and IV, the curve $V_4$, the parameter value $s$ of which is smaller than that of the primary curve $V_3$, has only one stable point of intersection with the curve I.

The slope of the curve I in turn depends upon the data of the generator G*en* and is a constant of the generator concerned.

In the generator diagram of FIG. 5 the family of circles $V_1$ to $V_4$ has the same parameter values as the family of curves $V_1$ to $V_4$ in FIG. 4. The circles are the loci for operating conditions having the same standing-wave ratio $s$. Lines $\Omega_0$ to $\Omega_9$ and to $1/\Omega_9$ are the loci of the points having the same frequency $\omega_{Gen}$ FIG. 4 they are shown with the associated abscissae. The points of intersection of the curve I with the curves $V_1$ to $V_3$ in FIG. 4 form a curve VI in FIG. 5 which encloses a guttiform region, which, as has been set forth with reference to FIG. 4, is skipped by the operating point and in which the region VII of electronic instability is situated. Points 14 to 17 are identical with those of FIG. 4 and indicate the stable operating points shown in that figure In FIG. 5, the point 13 of FIG. 4 (origin of the coordinate axes) does not take the form of a point but of the real axis 13 of the generator diagram; consequently, the point 13', which in the diagram of FIG. 4 is the point of intersection of the boundary curve $V_3$ for $s_{max}$ and of the generator susceptance curve I, is also situated on this axis 13. At this point the circle $V_3$ is tangent to the curve VI which bounds the guttiform region.

The dot-dash curves $P_1$ to $P_6$ are the loci of the points of the same generator power, $P_1$ relating to a low and $P_6$ to a high power.

The diagram of FIG. 5 shows that the mean operating point may be located in the region of high generator power without the risk of a stable operating point being adjusted in the region of electronic instability. As has been set forth in the preamble, operation in the region of electronic instability will rapidly lead to destruction of the generator. In order to locate a mean operating point in the region of high generator power, the generator G*en* is matched to the waveguide H*l* so that the generator G*en* and the waveguide H*l* form a system which is well-matched in itself. The load having average values ("the average load") then is well matched to this system so that for the average load an operating point is produced in or near the centre of the generator diagram, after which, by adjustment of the tuning stud 7, the mean operating point is moved from the centre of the generator diagram to the region of high efficiency and hence of high ouput power.

With respect to the load plane (coupling-out plane) 3 FIGS. 1 to 5 relate to the "ohmic" coupling-out plane of the generator and not to an incidental embodiment of the coupling out, which in most cases for mechanical reasons is spaced from the ohmic generator coupling-out plane by an interposed waveguide section. If in the technical data of the generator, as usually is the case, the generator diagram relates to the mechanical connecting plane, by suitable interposition of a line having a characteristic impedance $Z_0$ equal to that of the generator output the ohmic coupling-out plane at a distance $\lambda_W/2$ or an integral multiple thereof must be substituted. This length may be subtracted from the length $l_W$ of the waveguide calculated according to the above formula. As a result, the frequency curve $\Omega_0$ and hence the region of electronic instability are shifted in the generator diagram towards the real axis so that the situation shown in FIG. 5 is produced.

The boundary curve $V_3$ is shown in FIG. 5 for a standing-wave ratio $s_{max}$ of 2.75. This value lies at a sufficiently safe distance from the region of electronic instability, which in the generator shown begins at $s=3.5$.

From the above formula it can be deduced that the waveguide H*l* may be shorter as the waveguide wavelength $\lambda_W$ is longer. Consequently, a waveguide may be used which is operated near its boundary wavelength, where the waveguide wavelength considerably exceeds the wavelength in free space.

As has been mentioned hereinbefore, the mean operating point is advantageously located in the region of high power. The locus of substantially all operating points then passes preferably through this region and does not extend far into the region of lower power. However, the frequency is greatly changed, as the diagram shows. This is highly desirable in a microwave oven of known construction in which the material to be heated is treated in a cavity resonator, the dimensions of which are large compared with the wavelength, because the number of oscillation modes in such a resonator increases with an increase in the operating frequency range. If only one or a few oscillation modes occur, an energy raster is likely to be produced in the material being treated, which results in uneven heating. This raster is spatially different for the various oscillation modes. Consequently, when the frequency varies continuously over a wide range, a large number of oscillation modes occur so that the energy raster in the material is continually changed spatially, and the energy distribution is made more uniform.

This effect may be enhanced by feeding the generator with unsmoothed current, which in known manner gives rise to an additional frequency modulation.

What is claimed is:

1. A device for generating and supplying high frequency energy to a variable load that exhibits a complex admittance in the operating frequency range of the device comprising, a self-excited continuous-wave velocity modulation tube generator adapted to operate at a high power level near its region of electronic instability, and means for coupling the generator to the load comprising a substantially loss-free waveguide whose length is:

$$l_W \geqq \frac{Q_{E\ Gen}\dfrac{\lambda_0^2}{\lambda_W}}{\pi(s^2_{max.}-1)}$$

where $Q_{E\ Gen}$ is the external Q factor of the generator, $\lambda 0$ is the wavelength in free space at the mean generator generator frequency, $\lambda_W$ is the wavelength in the waveguide at the mean generator frequency, and $s_{max}$ is the maximum permissible standing-wave ratio of the generator viewed in a direction towards the region of electronic instability, said waveguide reacting with said generator to cause the generator frequency to jump the region of electronic instability for given values of load impedance that otherwise would cause the generator to operate in said region of electronic instability.

2. A device as claimed in claim 1 wherein the load is so chosen or so coupled to the waveguide that the generator operates substantially in its region of high efficiency.

3. A device as claimed in claim 2 wherein the waveguide and the generator together form a system which is well-matched in itself, the mean value of the load being chosen so that the load itself is well-matched to this system, and an adjustable transformation member disposed near the coupling-out plane for coupling the load to the waveguide so that the generator operates substantially in the region of high efficiency.

4. A device as claimed in claim 1 wherein the waveguide has a waveguide wavelength $\lambda_W$ which is large compared with the wavelength $\lambda_0$ in free space.

5. A device for supplying high frequency energy to a variable load that produces energy reflections in the operating frequency range of the device comprising, a self-excited velocity modulation tube generator, and means for coupling the generator to the load comprising a substantially loss-free waveguide whose length is:

$$l_W \geq \frac{Q_{E\ Gen}\dfrac{\lambda_0^2}{\lambda_W}}{\pi(s_{max.}^2-1)}$$

where $Q_{E\ Gen}$ is the external Q factor of the generator, $\lambda_0$ is the wavelength in free space at the mean generator frequency, $\lambda_W$ is the wavelength in the waveguide at the mean generator frequency, and $s_{max}$ is the maximum permissible standing-wave ratio of the generator viewed in a direction towards the region of electronic instability.

6. A device as claimed in claim 5 further comprising a metal container for said loading having an aperture that communicates with the end of said waveguide furthest from said generator, and an adjustable tuning member in said waveguide in the vicinity of said aperture for adjusting the operating point of the generator into its region of high efficiency.

References Cited

UNITED STATES PATENTS

| | | | |
|---|---|---|---|
| 2,751,499 | 6/1956 | Glass | 331—88 |
| 3,196,242 | 7/1965 | De Vries et al. | 219—10.55 |
| 3,283,113 | 11/1966 | Smith | 219—10.55 |

JOHN KOMINSKI, Primary Examiner

U.S. Cl. X.R.

219—10.55; 331—91